(12) United States Patent
Burgard (10) Patent No.: US 8,770,836 B2
(45) Date of Patent: Jul. 8, 2014

(54) WIRELESS TEMPERATURE PROFILING SYSTEM

(75) Inventor: Daniel Burgard, Wauseon, OH (US)

(73) Assignee: First Solar, Inc., Perrysburg, OH (US)

( * ) Notice: Subject to any disclaimer, the term of this patent is extended or adjusted under 35 U.S.C. 154(b) by 1144 days.

(21) Appl. No.: 12/687,726

(22) Filed: Jan. 14, 2010

(65) Prior Publication Data

US 2010/0220766 A1   Sep. 2, 2010

Related U.S. Application Data

(60) Provisional application No. 61/145,105, filed on Jan. 15, 2009.

(51) Int. Cl.
*G01K 7/00* (2006.01)

(52) U.S. Cl.
USPC .......................... 374/120; 374/100; 340/10.1

(58) Field of Classification Search
USPC ........ 374/120, 100, 121, E7.01, E7.001, 141, 374/163, 183–185; 340/870.01, 870.15, 340/870.17, 584, 10.42, 10.1, 572.1–572.8
See application file for complete search history.

(56) References Cited

U.S. PATENT DOCUMENTS

| | | | | |
|---|---|---|---|---|
| 4,576,485 A | * | 3/1986 | Lambert | 374/130 |
| 5,118,200 A | * | 6/1992 | Kirillov et al. | 374/120 |
| 5,572,445 A | * | 11/1996 | Shook et al. | 702/130 |
| 5,641,634 A | * | 6/1997 | Mandecki | 435/6.19 |
| 5,985,678 A | * | 11/1999 | Kiyama | 438/5 |
| 6,025,725 A | * | 2/2000 | Gershenfeld et al. | 324/652 |
| 6,062,728 A | * | 5/2000 | Breunsbach et al. | 374/142 |
| 6,611,556 B1 | * | 8/2003 | Koerner et al. | 375/224 |
| 7,089,099 B2 | * | 8/2006 | Shostak et al. | 701/29.6 |
| 7,259,676 B2 | * | 8/2007 | Knadle et al. | 340/572.4 |
| 7,347,538 B2 | * | 3/2008 | Mita | 347/68 |
| 7,377,168 B2 | * | 5/2008 | Liu | 73/579 |
| 7,385,503 B1 | * | 6/2008 | Wells et al. | 340/539.26 |
| 7,443,301 B2 | * | 10/2008 | Tucker et al. | 340/572.8 |
| 7,461,972 B2 | * | 12/2008 | Cohen | 374/100 |
| 7,547,150 B2 | * | 6/2009 | Downie et al. | 385/92 |
| 7,602,307 B1 | * | 10/2009 | Brennan et al. | 340/686.2 |
| 7,777,623 B2 | * | 8/2010 | Albsmeier et al. | 340/539.26 |
| 7,791,481 B2 | * | 9/2010 | Landt et al. | 340/572.1 |
| 7,791,489 B2 | * | 9/2010 | Gelbman et al. | 340/572.8 |
| 8,006,566 B2 | * | 8/2011 | Sopori et al. | 73/800 |
| 8,054,163 B2 | * | 11/2011 | Bayley et al. | 340/10.42 |
| 8,066,185 B2 | * | 11/2011 | Rock | 235/439 |
| 8,097,857 B2 | * | 1/2012 | Cochran et al. | 250/358.1 |
| 2005/0168340 A1 | * | 8/2005 | Mosher et al. | 340/572.8 |
| 2006/0080819 A1 | * | 4/2006 | McAllister | 29/403.3 |
| 2007/0012349 A1 | * | 1/2007 | Gaudiana et al. | 136/244 |
| 2008/0030305 A1 | * | 2/2008 | O'Connor | 340/10.1 |
| 2008/0079542 A1 | * | 4/2008 | Rofougaran | 340/10.1 |
| 2008/0150698 A1 | * | 6/2008 | Smith et al. | 340/10.4 |
| 2008/0303637 A1 | * | 12/2008 | Gelbman et al. | 340/10.42 |
| 2009/0303013 A1 | * | 12/2009 | Edgerton | 340/10.1 |
| 2011/0156883 A1 | * | 6/2011 | Balbo Di Vinadio et al. | 340/10.42 |
| 2011/0222577 A1 | * | 9/2011 | Bar-Cohen et al. | 374/117 |
| 2012/0000247 A1 | * | 1/2012 | Burgard et al. | 65/29.12 |
| 2012/0027923 A1 | * | 2/2012 | Burgard | 427/74 |

* cited by examiner

*Primary Examiner* — R. A. Smith
*Assistant Examiner* — Tania Courson
(74) *Attorney, Agent, or Firm* — Dickstein Shapiro LLP (57) ABSTRACT

A wireless temperature profiling system and the methods of making it are disclosed. The wireless temperature profiling system can include a photovoltaic substrate, a transponder, and a reader.

43 Claims, 8 Drawing Sheets

WIRELESS TEMPERATURE PROFILING SYSTEM

CLAIM OF PRIORITY

This application claims priority to U.S. Provisional Patent Application No. 61/145,105, filed on Jan. 15, 2009, which is incorporated by reference in its entirety.

TECHNICAL FIELD

This invention relates to a wireless temperature profiling system and the methods of making it.

BACKGROUND

Temperature profiling is the process of recording and interpreting temperatures of products and/or air through a conveyorized process. By analyzing the profile, it can be possible to verify products are of the highest quality, increase throughput, and solve production problems. Accurate temperature profiling gives process engineers reliable data to optimize the process, improve process control, and make corrections when required.

DETAILED DESCRIPTION

To measure the temperature profile during a photovoltaic module manufacturing process, a wireless temperature profiling system may include at least one transponder and at least one reader. The transponder can be adjacent to a photovoltaic substrate and send a temperature signal corresponding to an environment temperature. The reader can send sweep signals and pick up the temperature signal from the transponder. The transponder can be a passive wireless device. Therefore, no power source is needed for the transponder and the transponder can be placed separately without power wire or connection to a record device, resulting in higher accuracy and flexibility of the temperature profile measurement.

In one aspect, a wireless temperature profiling system may include a photovoltaic substrate, a transponder, and a reader. The transponder can be adjacent to the photovoltaic substrate and can send a temperature signal corresponding to an environment temperature. The reader can send sweep signals and pick up the temperature signal from the transponder. The reader may include a frame antenna in communication with the reader and receiving the temperature signal from the transponder. The reader may include memory storing data received from the transponder and a data output interface configured to connect the reader with a host system. The reader can be connected to a power source. The transponder can be a passive device. The transponder may include a thermometer. The thermometer can be a resistance thermometer. The transponder may include a transmitter to send the temperature signal and a piezoelectric energy harvester driving the transmitter.

The transponder may include a radio-frequency powered inductive-capacitive sensor (known as an "LC sensor"). The transponder may include a metal spiral inductor as a part of the radio-frequency powered LC sensor. The transponder may include an inductance temperature dependent material, an inductance temperature dependent device, a capacitance temperature dependent material, or a capacitance temperature dependent device. The capacitance temperature dependent device may include a high temperature ceramic material, beryllium oxide, aluminum nitride, alumina, machinable glass-ceramic, or MACOR.

The transponder can be encapsulated. The working frequency of the wireless temperature profiling system can be 30 kHz to 3 GHz, 30 kHz to 300 kHz, 3 MHz to 30 MHz, 300 MHz to 3 GHz.

In another aspect, a method of making a transponder reading an environment temperature can include providing a photovoltaic substrate, providing a transponder adjacent to the substrate which reads an environment temperature and returns a temperature signal corresponding to the temperature, providing a reader which sends a sweep signal and picks up the temperature signal from the transponder, generating a temperature signal from the transponder, receiving the temperature signal with an antenna connected to the reader, and converting the temperature signal to a corresponding temperature. The method can further include providing a thermometer. The method can further include providing a resistance thermometer and providing a transmitter connected to the thermometer. The method can further include providing a piezoelectric energy harvester.

The method can further include providing a radio-frequency powered LC sensor, an inductance temperature dependent material, or a capacitance temperature dependent material.

In another aspect, a wireless temperature profiling system may include a plurality of transponders and a plurality of readers. The transponders can be adjacent to a photovoltaic substrate and can move along the interrogation path. Each of the transponders can simultaneously send a temperature signal corresponding to an environment temperature. The readers can be placed along the interrogation path. Each of the readers can simultaneously send a sweep signal and pick up a signal from a transponder. Each of the readers may include a frame antenna in communication with the reader, memory storing data received from the transponder, and a data output interface configured to connect the reader with a host system. The transponder can be a passive device.

Each of the transponders can include a thermometer. Each of the transponders can include a resistance thermometer. The transponder can include a transmitter to send the temperature signal and a piezoelectric energy harvester driving the transmitter. Each of the transponders may include a radio-frequency powered LC sensor. Each of the transponders may include a metal spiral inductor as a part of the radio-frequency powered LC sensor. The working frequency of the wireless temperature profiling system can be 30 kHz to 3 GHz. Each of the transponders may include an inductance temperature dependent material, an inductance temperature dependent device, a capacitance temperature dependent material, or a capacitance temperature dependent device. The capacitance temperature dependent device may include a high temperature ceramic material.

Figure 1:
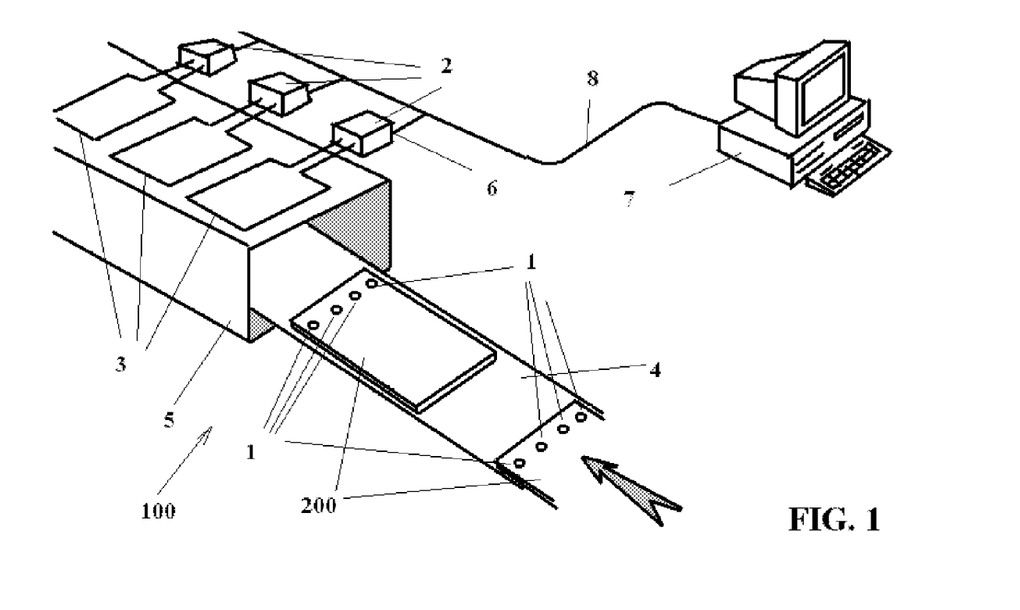
FIG. 1 is a schematic illustration of a typical temperature profiling system.

Referring to FIG. 1, wireless temperature profiling system 100 may include at least one passive transponder 1, at least one reader 2 to communicate with the transponder 1 and manage standard data output interface 6. Host system (e.g., computer) 7 interfaces with reader 2 and directs the interrogation of transponder 1 disposed on or embedded in carrier 4 moving along interrogation path 5 and any following action via parallel, serial or bus communications 8. Reader 2 can be placed along an interrogation path 5 to provide an active RF interrogation zone. Carrier 4 can be a conveyer. Carrier 4 can be an article being conveyed, such as a photovoltaic substrate being processed to form a photovoltaic module.

Each reader 2 may have frame antenna 3 and standard data output interface 6 (e.g., SI8, SI9, or other interfaces of RS232 standard, other single-wire or multi-wire serial binary data interface, interfaces of USB, interfaces of parallel communication, or interfaces of GPIB). The working frequency of the system can be 30 kHz to 3 GHz, for example, 30 kHz to 300 kHz, 3 MHz to 30 MHz, and 300 MHz to 3 GHz.

Reader 2 outputs a sweep signal from antenna 3, which picks up a temperature signal from transponder 1, which corresponds to a specific temperature. A plurality of transponders 1 can be disposed on photovoltaic modules 200 or embedded in carrier 4 moving along interrogation path 5, allowing simultaneous readings to be taken from each transponder 1. In this way, a more complete temperature profile can be obtained than by reading a single transponder at a time.

Figure 2:
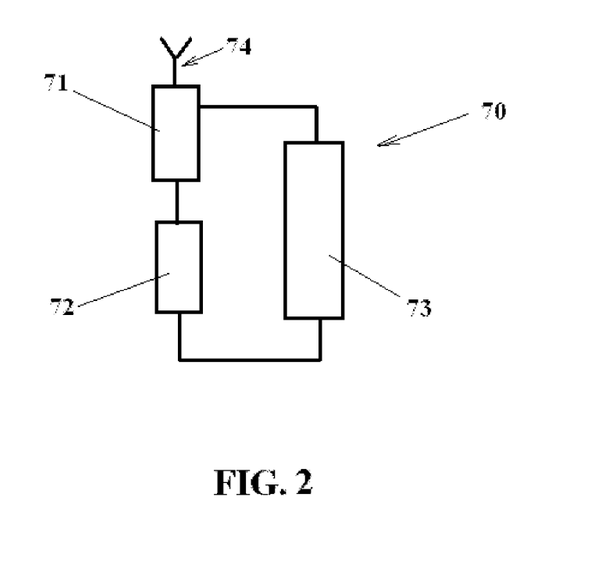
FIG. 2 is a general block diagram of an embodiment of a transponder.

The temperature signal from transponder 1 can communicate any value which is correlated to a specific temperature. For example, referring to FIG. 2, transponder 70 may include resistance temperature detector (RTD) 72, piezoelectric energy harvester 73, and transmitter 71. Transmitter 71 may include antenna 74. Resistance temperature detector (RTD) 72 detects the environment temperature. Transmitter 71 sends the temperature signal from resistance temperature detector (RTD) 72. Transmitter 71 and resistance temperature detector (RTD) 72 can be driven by piezoelectric energy harvester 73.

A passive transponder can be configured to respond to an external sweep signal by communicating the information that correlates to temperature. For example, referring to FIG. 3, passive transponder 13 may include metal spiral inductor 14 and temperature dependent capacitor 9. Temperature dependent capacitor 9 may have a first end 10, a second end 12, and an insulator layer 11 made of capacitance temperature dependent material. Metal spiral inductor 14 can be electrically connected to the temperature dependent capacitor 9 with conductive wire 15 at the contact point 16. The conductive wire 15 can be attached to the temperature dependent capacitor 9 by soldering, wire bonding, silver epoxy or other conductive adhesive. Insulator layer 11 can be made of high temperature ceramic material, beryllium oxide, aluminum nitride, alumina, machinable glass-ceramic, or MACOR.

Figure 3:
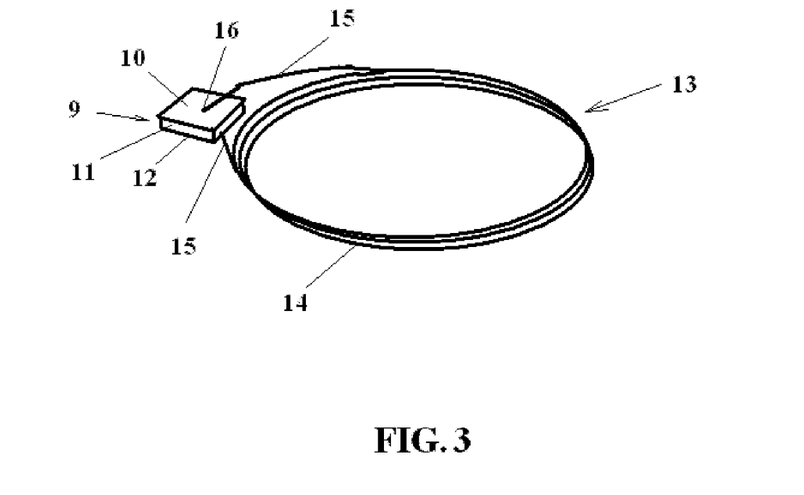
FIG. 3 is a perspective view of an embodiment of a transponder.
Figure 4:
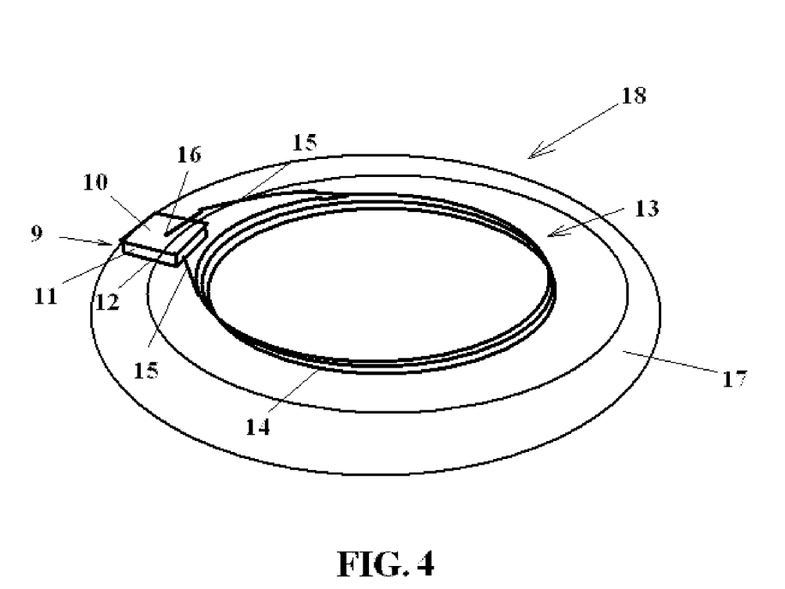
FIG. 4 is a perspective view of the transponder shown in FIG. 3 with an encapsulation.

Referring to FIG. 4, encapsulated passive transponder 18 may include passive transponder 13 in FIG. 3 and encapsulation 17. The encapsulation can be done with Low temperature co-fired ceramic (LTCC).

Figure 5:
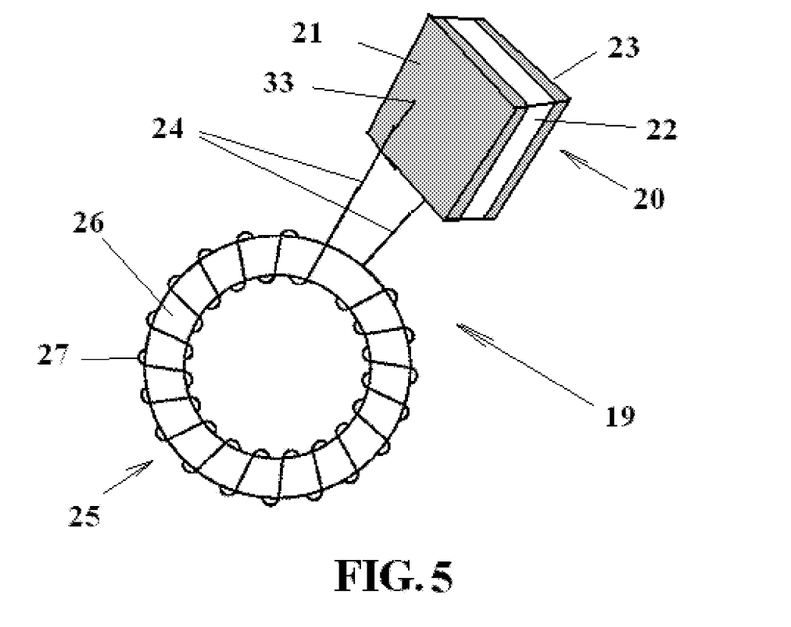
FIG. 5 is a perspective view of another embodiment of a transponder.

Referring to FIG. 5, passive transponder 19 may include metal spiral inductor 25 and temperature dependent capacitor 20. Temperature dependent capacitor 20 may have first end 21, second end 23, and insulator layer 22 made of capacitance temperature dependent material. Metal spiral inductor 25 may include coil 27 of conducting material (e.g. copper wire) wrapped around core 26 of ferromagnetic material. Metal spiral inductor 25 can be electrically connected to temperature dependent capacitor 20 with conductive wire 24 at contact point 33. Conductive wire 24 can be attached to temperature dependent capacitor 20 by soldering, wire bonding, silver epoxy or other conductive adhesive. Insulator layer 22 can be made of high temperature ceramic material, beryllium oxide, aluminum nitride, alumina, machinable glass-ceramic, or MACOR.

Figure 6:
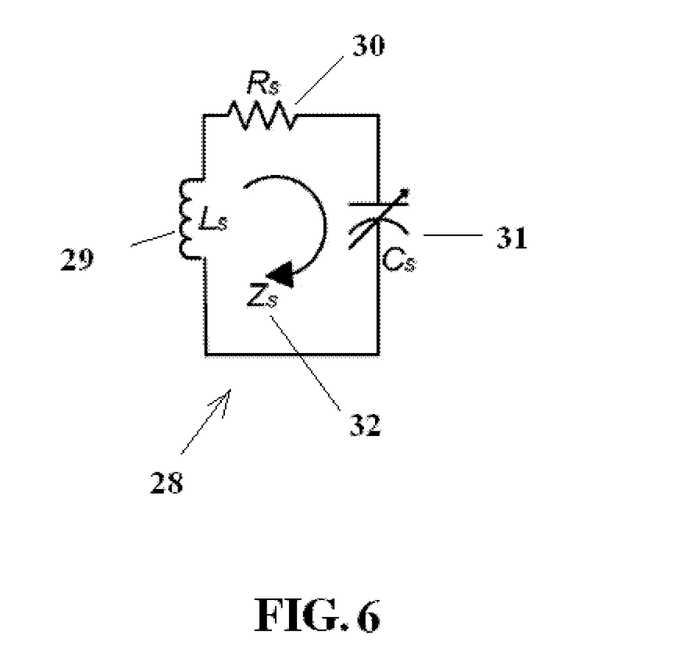
FIG. 6 is a general electrical diagram of an embodiment of a transponder.

Referring to FIG. 6, equivalent circuit of a transponder 28 may include inductance $L_S$ 29, temperature dependent capacitor $C_S$ 31, and ohmic resistance in the sensor $R_S$ 30. When the value of temperature dependent capacitor $C_S$ 31 changes with environment temperature, impedance Zs 32 of transponder 28 changes too. Therefore, the environment temperature can be determined by tracking the resonant frequency of transponder 28.

Figure 7:
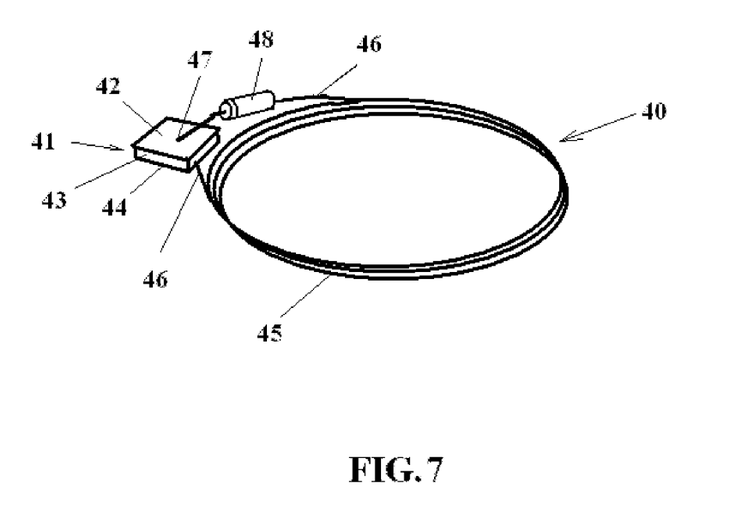
FIG. 7 is a perspective view of another embodiment of a transponder.

Referring to FIG. 7, passive transponder 40 may include metal spiral inductor 45, temperature dependent capacitor 41, and temperature sensitive diode 48. Temperature dependent capacitor 41 may have first end 42, second end 44, and insulator layer 43 made of capacitance temperature dependent material. Metal spiral inductor 45 can be electrically connected to temperature dependent capacitor 41 and temperature sensitive diode 48 with conductive wire 46. Conductive wire 46 can be attached to temperature dependent capacitor 41 and temperature sensitive diode 48 by soldering, wire bonding, silver epoxy or other conductive adhesive. Insulator layer 43 can be made of high temperature ceramic material, beryllium oxide, aluminum nitride, alumina, machinable glass-ceramic, or MACOR.

Figure 8:
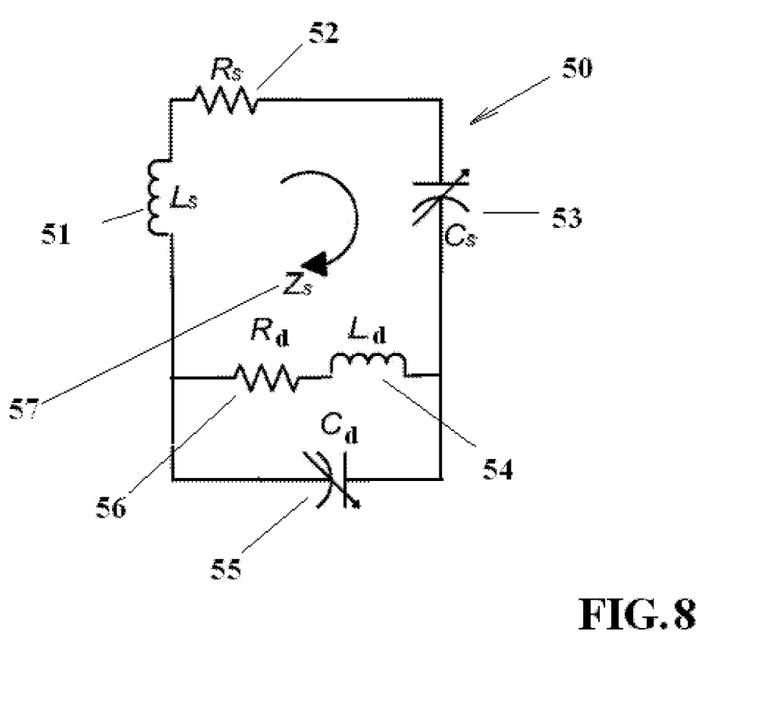
FIG. 8 is a general electrical diagram of the embodiment of a transponder shown in FIG. 7.

Referring to FIG. 8 as a general electrical diagram of an embodiment of a transponder shown in FIG. 6 when the transponder is in its "On" (resonating) state, equivalent circuit of a transponder 50 may include inductance $L_S$ 51, temperature dependent capacitor $C_S$ 53, ohmic resistance in the sensor $R_S$ 52, inductance $L_d$ 54 in temperature sensitive diode (48 in FIG. 7), temperature dependent capacitor $C_d$ 55 in temperature sensitive diode (48 in FIG. 7), and ohmic resistance $R_d$ 56 in temperature sensitive diode (48 in FIG. 7). When the value of temperature dependent capacitor $C_S$ 31 and $C_d$ 55 changes with environment temperature, impedance Zs 57 of transponder 50 changes too. Therefore, the environment temperature can be determined by tracking the resonant frequency of transponder 50. By adding temperature sensitive diode (48 in FIG. 7), the Q value of resonating transponder 50 can be further controlled to get better performance.

A number of embodiments of the invention have been described. Nevertheless, it will be understood that various modifications may be made without departing from the spirit and scope of the invention. It should also be understood that the appended drawings are not necessarily to scale, presenting a somewhat simplified representation of various preferred features illustrative of the basic principles of the invention.

What is claimed is:

1. A system for measuring an environment temperature of a photovoltaic substrate during a photovoltaic module manufacturing process, comprising:

a transponder adjacent to the photovoltaic substrate which measures the environment temperature during the photovoltaic module manufacturing process and sends a temperature signal corresponding to the environment temperature; and a reader which sends a sweep signal and picks up the temperature signal from the transponder.

2. The wireless temperature profiling system of claim 1, further comprising a frame antenna in communication with the reader, wherein the frame antenna receives the temperature signal from the transponder.

3. The wireless temperature profiling system of claim 1, wherein the reader comprises memory storing data received from the transponder.

4. The wireless temperature profiling system of claim 1, wherein the reader comprises a data output interface configured to connect the reader with a host system.

5. The wireless temperature profiling system of claim 1, wherein the reader is connected to a power source.

6. The wireless temperature profiling system of claim 1, wherein the transponder comprises a passive device, including a temperature sensor.

7. The wireless temperature profiling system of claim 6, wherein the transponder comprises a transmitter to send a temperature signal from the temperature sensor.

8. The wireless temperature profiling system of claim 7, wherein the transponder comprises an energy harvester driving the transmitter.

9. The wireless temperature profiling system of claim 8, wherein the energy harvester comprises a piezoelectric energy harvester.

10. The wireless temperature profiling system of claim 1, wherein the transponder comprises a radio-frequency powered LC sensor.

11. The wireless temperature profiling system of claim 10, wherein the transponder comprises a metal spiral inductor as a part of the radio-frequency powered LC sensor.

12. The wireless temperature profiling system of claim 10, wherein the transponder comprises an inductance temperature dependent material.

13. The wireless temperature profiling system of claim 10, wherein the transponder comprises an inductance temperature dependent device as a part of the radio-frequency powered LC sensor.

14. The wireless temperature profiling system of claim 10, wherein the transponder further comprises a capacitance temperature dependent material.

15. The wireless temperature profiling system of claim 10, wherein the transponder further comprises a capacitance temperature dependent device as a part of the radio-frequency powered LC sensor.

16. The wireless temperature profiling system of claim 15, wherein the capacitance temperature dependent device comprises a high temperature ceramic material.

17. The wireless temperature profiling system of claim 15, wherein the capacitance temperature dependent device comprises beryllium oxide, aluminum nitride, alumina, or a machinable glass-ceramic.

18. The wireless temperature profiling system of claim 15, wherein the machinable glass-ceramic comprises MACOR.

19. The wireless temperature profiling system of claim 1, wherein the transponder is encapsulated.

20. The wireless temperature profiling system of claim 1, wherein the working frequency of the system is 30 kHz to 3 GHz.

21. The wireless temperature profiling system of claim 1, wherein the working frequency of the system is 30 kHz to 300 kHz.

22. The wireless temperature profiling system of claim 1, wherein the working frequency of the system is 3 MHz to 30 MHz.

23. The wireless temperature profiling system of claim 1, wherein the working frequency of the system is 300 MHz to 3 GHz.

24. The wireless temperature profiling system of claim 1, wherein the transponder is provided on the substrate.

25. The wireless temperature profiling system as in claim 1, wherein the transponder is provided on a carrier which moves the substrate.

26. A method of reading an environment temperature of a photovoltaic substrate during a photovoltaic module manufacturing process, the method, comprising:
   providing a transponder adjacent to the photovoltaic substrate which reads an environment temperature during the photovoltaic module manufacturing process and returns a temperature signal corresponding to the temperature;
   providing a reader which sends a sweep signal and picks up the temperature signal from the transponder;
   generating a temperature signal from the transponder;
   receiving the temperature signal with an antenna connected to the reader; and
   converting the temperature signal to a corresponding temperature.

27. The method of claim 26, wherein the transponder comprises a temperature sensor which provides the temperature signal.

28. The method of claim 27, wherein the transponder further comprises a transmitter to send the temperature signal.

29. The method of claim 28, wherein the transponder comprises a piezoelectric energy harvester, a radio-frequency powered LC sensor, and the temperature sensor comprises an inductance temperature dependent material, or a capacitance temperature dependent material.

30. A wireless temperature profiling system for communicating with at least one transponder moveable along an interrogation path comprising:
   a photovoltaic substrate moving along said interrogation path during processing to form a photovoltaic module;
   a plurality of transponders adjacent to the photovoltaic substrate moving along the interrogation path, wherein each of the transponders simultaneously sends a temperature signal corresponding to an environment temperature;
   a plurality of readers along the interrogation path, wherein each of the readers simultaneously sends a sweep signal and picks up a signal from a transponder.

31. The wireless temperature profiling system of claim 30, wherein each reader comprises a frame antenna, memory storing data received from a transponder, and a data output interface configured to connect the reader with a host system.

32. The wireless temperature profiling system of claim 30, wherein at least one of the transponders comprise a passive device, including a temperature sensor.

33. The wireless temperature profiling system of claim 30, wherein each transponder comprises a transmitter to send the temperature signal.

34. The wireless temperature profiling system of claim 33, wherein each transponder comprises a piezoelectric energy harvester driving the transmitter.

35. The wireless temperature profiling system of claim 30, wherein each transponder comprises a radio-frequency powered LC sensor.

36. The wireless temperature profiling system of claim 30, wherein each transponder comprises a metal spiral inductor as a part of a radio-frequency powered LC sensor.

37. The wireless temperature profiling system of claim 30, wherein the working frequency of the system is 30 k to 3 GHz.

38. The wireless temperature profiling system of claim 30, wherein each transponder comprises an inductance temperature dependent material.

39. The wireless temperature profiling system of claim 30, wherein each transponder comprises an inductance temperature dependent device as a part of a radio-frequency powered LC sensor.

40. The wireless temperature profiling system of claim 30, wherein each transponder comprises a capacitance temperature dependent material or a high temperature ceramic material.

41. The wireless temperature profiling system of claim 30, wherein each transponder comprises a capacitance temperature dependent device as a part of a radio-frequency powered LC sensor.

42. The wireless temperature profiling system of claim 30, wherein the transponder is provided on the substrate.

43. The wireless temperature profiling system as in claim 30, wherein the transponder is provided on a carrier which moves the substrate.

\* \* \* \* \*